United States Patent Office.

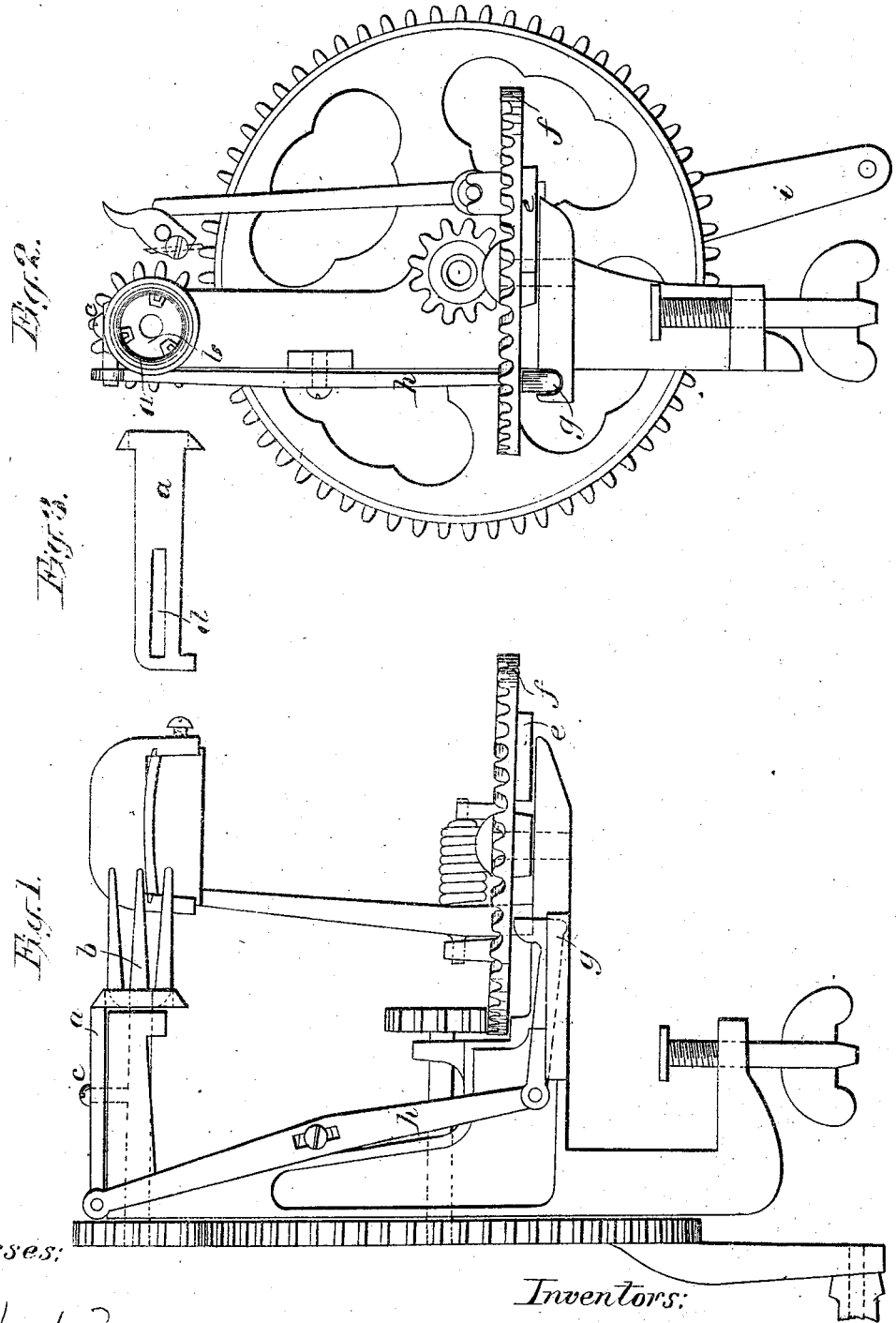

LEVI D. FARWELL, OF LANCASTER, AND ARTEMUS W. GODDARD, OF CLINTON, MASSACHUSETTS.

Letters Patent No. 77,600, dated May 5, 1868; antedated April 25, 1868.

IMPROVED FRUIT-PARER.

*The Schedule referred to in these Letters Patent and making part of the same.*

TO ALL WHOM IT MAY CONCERN:

Be it known that we, LEVI D. FARWELL, of Lancaster, county of Worcester, and State of Massachusetts, and ARTEMUS W. GODDARD, of Clinton, county of Worcester, and State of Massachusetts, have invented a new and useful Improvement on Machines for Paring Fruits or Vegetables; and we do hereby declare that the following is a full and exact description thereof, reference being had to the accompanying drawing, making a part of this specification, in which—

Figure 1 is a side view.
Figure 2, an end view.
Figure 3 is a detail view, to be hereinafter referred to.

The nature of our invention consists in applying an attachment to paring-machines that shall remove the fruit or vegetable from the fork mechanically, after it has been pared.

To enable others skilled in the art to make and use our invention, we will proceed to describe its construction and operation.

We apply a slide, of the form as shown at figs. 1, 2, and 3, which is so attached to the machine that it shall at the proper time crowd the fruit or vegetable from the fork.

The slide $a$ is made of malleable iron, or any other suitable material, and is held in place by the fork which it encircles, and the screw $c$ passing through the slot $d$. It is moved in the proper time by the cam $e$ on the under side of the bevel-gear, (or any other substantial device,) operating on the sliding foot $g$, which is attached to the lower end of the lever $h$, which at the upper end is attached to the slide $a$.

Having described the manner in which the devices composing our machine are arranged, we will now proceed to describe how the same operate together.

The fruit or vegetable being placed on the fork $f$, in the usual manner, it is pared by turning the crank $i$. As soon as the skin is removed, the cam $e$ begins to operate on the foot, $g$, which, in connection with the lever $h$, gives a forward motion to the slide $a$ in the direction of the points of the fork $b$.

As soon as the fruit or vegetable is crowded or removed from the fork, the slide ceases to move, and remains near the points of the fork.

In this position the slide is perfectly free to be moved backwards, either by crowding on the article to be pared, or otherwise.

Having thus described our invention, we claim as new, and desire to secure by Letters Patent—

The slide $a$, the lever $h$, and the foot $g$ with cam $e$, or any other mechanical device, substantially as and for the purpose specified.

LEVI D. FARWELL,
ARTEMUS W. GODDARD.

Witnesses:
ERI RICHARDSON,
GEORGE W. BROOKS.